United States Patent
Nishida (10) Patent No.: US 8,139,185 B2
(45) Date of Patent: *Mar. 20, 2012

(54) DISPLAY DEVICE

(75) Inventor: Kenji Nishida, Otsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 437 days.

This patent is subject to a terminal disclaimer.

(21) Appl. No.: 12/307,639

(22) PCT Filed: Feb. 21, 2007

(86) PCT No.: PCT/JP2007/053214
§ 371 (c)(1),
(2), (4) Date: Jan. 6, 2009

(87) PCT Pub. No.: WO2008/004353
PCT Pub. Date: Jan. 10, 2008

(65) Prior Publication Data
US 2009/0279027 A1    Nov. 12, 2009

(30) Foreign Application Priority Data
Jul. 7, 2006 (JP) .................... 2006-188068

(51) Int. Cl.
*G02F 1/1335* (2006.01)
*G02F 1/1343* (2006.01)
(52) U.S. Cl. ............... 349/114; 349/139; 349/141
(58) Field of Classification Search ............. None
See application file for complete search history.

(56) References Cited

U.S. PATENT DOCUMENTS

| | | | |
|---|---|---|---|
| 6,111,626 A * | 8/2000 | Watanabe et al. | 349/141 |
| 6,281,952 B1 | 8/2001 | Okamoto et al. | |
| 6,538,713 B1 | 3/2003 | Yanagawa et al. | |
| 7,088,409 B2 * | 8/2006 | Itou et al. | 349/114 |
| 2001/0052948 A1 | 12/2001 | Okamoto et al. | |
| 2003/0123012 A1 | 7/2003 | Yanagawa | |
| 2003/0218664 A1 | 11/2003 | Sakamoto et al. | |

(Continued)

FOREIGN PATENT DOCUMENTS

CN    1603915 A    4/2005

(Continued)

OTHER PUBLICATIONS

Notice of Allowance for U.S. Appl. No. 12/373,983 mailed Nov. 29, 2011; Nishida.

(Continued)

*Primary Examiner* — Michelle R Connelly Cushwa
(74) *Attorney, Agent, or Firm* — Nixon & Vanderhye P.C.

(57) ABSTRACT

The present invention provides a display device which can provide bright display by both of reflective display and transmissive display without having a multi-gap structure and which can reduce a difference in response time between the reflective region and the transmissive region. The display device of the present invention is a display device including: a pair of substrates; a display medium interposed between the pair of substrates; and a pixel having a reflective region for performing reflective display and a transmissive region for performing transmissive display, wherein the display device includes a pixel electrode and a common electrode on one of the pair of substrates, a voltage is applied to the display medium through the pixel electrode and the common electrode, the pixel electrode is provided with a slit, and a shield electrode is arranged between the pixel electrode and the common electrode in the reflective region.

25 Claims, 8 Drawing Sheets

U.S. PATENT DOCUMENTS

| | | | |
|---|---|---|---|
| 2005/0083462 A1 | 4/2005 | Lin | |
| 2005/0105033 A1 | 5/2005 | Itou | |
| 2005/0128407 A1* | 6/2005 | Lee et al. | 349/141 |
| 2005/0140620 A1* | 6/2005 | Aoyama et al. | 345/87 |
| 2005/0157239 A1* | 7/2005 | Yoo | 349/141 |
| 2005/0213013 A1* | 9/2005 | Chen et al. | 349/141 |
| 2005/0243251 A1 | 11/2005 | Yang et al. | |
| 2005/0253989 A1* | 11/2005 | Chen et al. | 349/141 |
| 2005/0264720 A1* | 12/2005 | Itou et al. | 349/99 |
| 2006/0050385 A1 | 3/2006 | Uehara | |
| 2006/0092363 A1* | 5/2006 | Hasegawa et al. | 349/141 |
| 2006/0268206 A1 | 11/2006 | Nishimura | |
| 2007/0013835 A1 | 1/2007 | Nishimura | |
| 2007/0040978 A1 | 2/2007 | Nakayoshi et al. | |
| 2007/0109455 A1 | 5/2007 | Kim et al. | |
| 2007/0165171 A1* | 7/2007 | Lee | 349/139 |
| 2009/0201449 A1* | 8/2009 | Nishida | 349/114 |
| 2009/0207366 A1* | 8/2009 | Kim | 349/147 |
| 2009/0225261 A1 | 9/2009 | Hasegawa et al. | |
| 2009/0262286 A1* | 10/2009 | Nishida | 349/114 |
| 2009/0262287 A1* | 10/2009 | Nishida | 349/114 |

FOREIGN PATENT DOCUMENTS

| | | | |
|---|---|---|---|
| EP | 1 912 093 | | 4/2008 |
| JP | 11-174493 | | 7/1999 |
| JP | 11174493 A | * | 7/1999 |
| JP | 11-242226 | | 9/1999 |
| JP | 2000-305097 | | 11/2000 |
| JP | 2001-166321 | | 6/2001 |
| JP | 2001166321 A | * | 6/2001 |
| JP | 2003-149664 | | 5/2003 |
| JP | 2005-106967 | | 4/2005 |
| JP | 2005-208567 | | 8/2005 |
| JP | 2005-338264 | | 12/2005 |
| JP | 2006-126602 | | 5/2006 |
| JP | 2006-184325 | | 7/2006 |
| JP | 1 744 205 | | 1/2007 |
| JP | 2007-004125 | | 1/2007 |
| JP | 2007-047734 | | 2/2007 |
| JP | 2007-058007 | | 3/2007 |
| JP | 2007-183585 | | 7/2007 |
| WO | 2005/006068 | | 1/2005 |

OTHER PUBLICATIONS

U.S. Appl. No. 12/373,983 filed Jan. 15, 2009; Nishida.
U.S. Appl. No. 12/375,246 filed Jan. 27, 2009; Nishida.
International Search Report for PCT/JP2007/05664, mailed Jun. 12, 2007.
Lim et al, "A Single Gap Transflective Display with Single Gamma Curve in the Fringe Field Switching Mode", Japanese Journal of Applied Physics, Japan Society of Applied Physics, Tokyo, JP, vol. 44, No. 50, Jan. 1, 2005, pp. L1532-L1534.
EP Supplementary Search Report mailed Jul. 27, 2009 in corresponding EP application 07740092.7.
EP Supplementary Search Report mailed Jul. 27, 2009 in corresponding EP application 09001552.0.
International Search Report for PCT/JP2007/056658, mailed Jun. 5, 2007.
Restriction Requirement for U.S. Appl. No. 12/373,983 mailed Feb. 2, 2011; Nishida.
Office Action for U.S. Appl. No. 12/373,983 mailed Mar. 22, 2011.
Final Office Action for U.S. Appl. No. 12/373,983 mailed Aug. 16, 2011; Nishida.
Election Requirement for U.S. Appl. No. 12/375,246 mailed Aug. 30, 2011; Nishida.
Office Action for U.S. Appl. No. 12/375,246 mailed Dec. 1, 2011; Nishida.

* cited by examiner

DISPLAY DEVICE

This application is the U.S. national phase of International Application No. PCT/JP2007/053214, filed 21 Feb. 2007 which designated the U.S. and claims priority to Japanese Application No. 2006-188068, filed 7 Jul. 2006, the entire contents of each of which are hereby incorporated by reference.

TECHNICAL FIELD

The present invention relates to a display device. More specifically, the present invention relates to a display device preferably used in a liquid crystal display in accordance with In Plane Switching (IPS) mode or Fringe Field Switching (FFS) mode.

BACKGROUND ART

Display devices such as a liquid crystal display device have been widely used in electronics such as a monitor, a projector, a cellular phone, and a personal digital assistant (PDA). Reflective, transmissive, and transflective display devices are mentioned as a display type of the liquid crystal display devices. Under relatively dark environments such as indoor environment, the transmissive liquid crystal display device which provides display using light from a backlight is mainly used. Under relatively bright environments such as outdoor environment, the reflective liquid crystal display device which provides display using external light is mainly used. The transflective liquid crystal display device can provide both of transmissive display and reflective display, and mainly provides transmissive display under indoor environments and provides reflective display under outdoor environments. Therefore, such a transflective liquid crystal display device can provide display with high qualities under any environments regardless of indoor or outdoor environments, and it has been widely equipped with mobile equipment such as a cellular phone, a PDA, and a digital camera. According to the transflective liquid crystal display device, for example, a Vertical Alignment (VA) mode is used as display mode. The VA mode is a mode in which a liquid crystal molecule is aligned to be vertical to the substrate surface when a voltage is not applied and display is carried out by tilting the liquid crystal molecule by application of a voltage.

However, according to the transflective liquid crystal display device, reflective light passes through the liquid crystal layer twice, but transmissive light passes through the liquid crystal layer only once. Therefore, if a cell gap is designed to be optimal for reflective light, the transmittance of the transmissive light is about ½ of the optimal value. As a solution for this, a method in which the reflective region and the transmissive region are formed to have different cell gaps to form a multi-gap structure, and the thickness of the liquid crystal layer in the reflective region is decreased is mentioned (for example, refer to Patent Document 1). However, this method needs to form irregularities on the substrate, which complicates the structure on the substrate. Further, the production steps of the substrate need to be performed with high accuracy. Therefore, such a method has room for improvement. In addition, there is room for improvement also in that the response time of the liquid crystal molecule is different between the reflective region and the transmissive region.

IPS mode and FFS mode have been known as display mode of the liquid crystal display device, in addition to the VA mode. According to the IPS and FFS modes, liquid crystal is operated by a horizontal electric field generated by a pair of electrodes for driving the liquid crystal, formed on one substrate. According to these systems, the liquid crystal molecule moves in the horizontal direction (in the direction parallel to the substrate), which widens the viewing angle. A transflective liquid crystal display device in IPS mode is disclosed (for example, refer to Patent Document 2). This device in IPS mode also has a multi-gap structure, and it fails to solve the above-mentioned problems.

Patent Document 1

Japanese Kokai Publication No. Hei-11-242226

Patent Document 2

Japanese Kokai Publication No. 2005-338264

DISCLOSURE OF INVENTION

The present invention has been made in view of the above-mentioned state of the art. The present invention has an object to provide a display device which can provide bright display by both of reflective display and transmissive display without having a multi-gap structure and which can reduce a difference in response time between the reflective region and the transmissive region.

The present inventor made various investigations on a display device which can provide bright display by both of reflective display and transmissive display without having a multi-gap structure. The inventor noted an arrangement relationship between a pixel electrode and a common electrode in the reflective region and the transmissive region. The inventor found the followings. If, in the horizontal electric field mode such as IPS mode and FFS mode, a shield electrode is arranged between the pixel electrode and the common electrode in the reflective region, an intensity of the electric field generated between the pixel electrode and the common electrode in the reflective region can be made smaller than that in the transmissive region without forming the multi-gap structure. As a result, light use efficiency in the reflective display and the transmissive display can be adjusted. As a result, the above-mentioned problems have been admirably solved, leading to completion of the present invention.

That is, the present invention is a display device including: a pair of substrates; a display medium interposed between the pair of substrates; and a pixel having a reflective region for performing reflective display and a transmissive region for performing transmissive display, wherein the display device includes a pixel electrode and a common electrode on one of the pair of substrates, a voltage is applied to the display medium through the pixel electrode and the common electrode, the pixel electrode is provided with a slit, and a shield electrode is arranged between the pixel electrode and the common electrode in the reflective region (hereinafter, also referred to as the first display device). The present invention is mentioned in more detail below.

The first display device of the present invention includes a pair of substrates, a display medium interposed between the pair of substrates, and a pixel having a reflective region for performing reflective display and a transmissive region for performing transmissive display. In the present invention, the kinds of the substrate and the display medium are not especially limited. For example, according to an active matrix liquid crystal display device, the following embodiment is mentioned. The active matrix liquid crystal display device includes: an active matrix substrate and a color filter substrate as a pair of substrates; and a liquid crystal layer interposed between these substrates as the display medium, wherein on the active matrix substrate, scanning wirings and signal wirings are arranged to be intersect with each other, and at each intersection, a TFT that is a switching element is arranged, and on the color filter substrate, color layers of red (R), green (G), and blue (B) are arranged in each pixel. The liquid crystal display device generally includes a polarizer, a backlight and the like, outside the substrates. The reflective display is a mode in which display is performed by reflecting light outputted from a front light arranged on the display surface side or external light, inside the display device. The transmissive display is a mode in which display is performed by transmitting light outputted from the backlight. The size of the reflective region and the transmissive region and the proportion of those regions in the pixel are not especially limited. The display device of the present invention is a transflective display device because the reflective region and the transmissive region are arranged in one pixel.

The display device of the present invention includes a pixel electrode and a common electrode on one of the substrates, and a voltage is applied to the display medium through the above-mentioned pixel electrode and the above-mentioned common electrode. Further, the above-mentioned pixel electrode is provided with a slit. If a voltage is applied to the pair of electrodes that is the pixel electrode and the common electrode, a horizontal electric field parallel to the substrate is generated in the display medium near the pixel electrode and the common electrode. This electric field controls the display medium. Examples of such a control mode employed in the present invention include: IPS mode in which the pixel electrode is provided with a slit, and the pixel electrode and the common electrode have a so-called comb-tooth shape, and these electrodes are arranged in the same layer to be engaged with each other; and FFS mode in which the pixel electrode or the common electrode has a comb-tooth shape and these electrodes are arranged in different layers.

In the present invention, the shield electrode is arranged between the pixel electrode and the common electrode in the reflective region. In the present description, the "shield electrode" means an electrode which is positioned between the pixel electrode and the common electrode to change a difference in electric potential between the pixel electrode and the common electrode. Due to the shield electrode arranged between the pixel electrode and the common electrode, the electric potential difference generated between the pixel electrode and the common electrode is smaller than that in the case that no shield electrode is arranged. In the present invention, only in the reflective region, the shield electrode is arranged. Therefore, the electric field intensity generated between the pixel electrode and the common electrode in the reflective region is smaller than that in the transmissive region. The alignment degree of the liquid crystal varies depending on the electric field intensity, and therefore, by using this feature, use efficiency of light which passes through the liquid crystal can be adjusted. The material for the shield electrode is not especially limited as long as it has conductivity. A transparent material is particularly preferable. A metal oxide such as indium tin oxide (ITO) is preferably used. The size and shape of the shield electrode are not especially limited as long as it can be arranged between the pixel electrode and the common electrode.

It is preferable that the shield electrode is connected to ground. If the shield electrode is connected to ground, a voltage applied to the shield electrode can be maintained at 0V. Further, if the shield electrode is connected to ground and thereby an electric potential of the shield electrode is 0V, an electric potential difference between the pixel electrode and the common electrode can be effectively decreased.

As a preferable embodiment of the pixel electrode of the present invention, an embodiment in which the pixel electrode has a comb-tooth shape may be mentioned, for example. If the pixel electrode has a comb-tooth shape, a high-density horizontal electric field can be generated between the pixel electrode and the common electrode, and hence, the display medium can be controlled with high accuracy.

The following embodiments are mentioned as a preferable embodiment of a slit provided for the pixel electrode. An embodiment in which the slit of the pixel electrode is entirely surrounded by the pixel electrode; an embodiment in which the slit of the pixel electrode has a rectangular shape; an embodiment in which the slit of the pixel electrode has a rectangular shape having one bent part; an embodiment in which the slit of the pixel electrode has a zig-zag shape; an embodiment in which the slit of the pixel electrode has a circular arc shape; and an embodiment in which the slit of the pixel electrode has a meandering shape. According to such embodiments, the pixel electrode and the common electrode are effectively engaged with each other. As a result, a high-density horizontal electric field can be generated and hence, the display medium can be controlled with high accuracy.

As the above-mentioned preferable embodiment of the common electrode, an embodiment in which the common electrode is formed in a layer different from the pixel electrode, and the shield electrode and an insulating film are between the pixel electrode and the common electrode, is also mentioned. According to the FFS mode in which the pixel electrode and the common electrode are arranged with an insulating film and the shield electrode therebetween, a horizontal electric field parallel to the substrate can be generated in the display medium. As such an embodiment, an embodiment in which one electrode has a comb-tooth shape and the other electrode is flat and has no slits may be mentioned. According to the FFS mode, the present invention can be applied even in the case that the pixel electrode and the common electrode cannot be formed in the same layer because of limitation of aperture ratio and the like.

Other preferable embodiments of the above-mentioned common electrode include an embodiment in which the common electrode is provided with a slit. In this case, it is preferable that the pixel electrode and the common electrode are arranged in a layer where the shield electrode is formed. The common electrode is also provided with a slit and the slit of the common electrode is engaged with the slit of the pixel electrode. Further, such pixel electrode and common electrode are arranged in the same layer. According to such IPS mode, a horizontal electric field parallel to the substrate can be generated in the display medium. If the pixel electrode and the common electrode are formed in the same layer as in the shield electrode, the electric field intensity can be more effectively decreased. Further, the pixel electrode, the common electrode, and the shield electrode are formed in the same layer, the production steps can be simplified, which improves productivity. In this case, it is preferable that the slit of the common electrode has substantially the same shape as a shape of the slit of the pixel electrode. According to such an embodiment, the intensity of the electric field generated at each part where the slit of the common electrode is engaged with the slit of the pixel electrode can be made uniform and as a result, alignment of the liquid crystal can be uniformly controlled. In the present embodiment, the term "the same" means that the same enough to uniform substantially the electric field intensity generated at each part (unless display qualities are influenced), that is, substantially the same.

It is preferable that a width of the slit of the pixel electrode in the reflective region is larger than a width of the slit of the pixel electrode in the transmissive region. According to such an embodiment, in the reflective region, the shield electrode can be easily arranged between the pixel electrode and the common electrode. Further, if a distance between the pixel electrode and the common electrode in the reflective region is larger than that in the transmissive region, the intensity of the electric field generated between the pixel electrode and the common electrode can be decreased in the reflective region than that in the transmissive region. Thus, if the shield electrode is arranged and further this embodiment is adopted, the intensity of the electric field generated between the pixel electrode and the common electrode can be more effectively decreased.

The present invention is a display device including: a pair of substrates; a display medium interposed between the pair of substrates; and a pixel having a reflective region for performing reflective display and a transmissive region for performing transmissive display, wherein the display device includes a pixel electrode and a common electrode on one of the pair of substrates, a voltage is applied to the display medium through the pixel electrode and the common electrode, the common electrode is provided with a slit, and a shield electrode is arranged between the pixel electrode and the common electrode in the reflective region (hereinafter, also referred to as "the second display device"). Thus, the second display device of the present invention, characterized by that the common electrode is provided with a slit and the shield electrode is arranged between the pixel electrode and the common electrode, also can exhibit the same effects as in the first display device of the present invention, characterized by that the pixel electrode is provided with a slit and the shield electrode is arranged between the pixel electrode and the common electrode. Similarly to the first display device, it is preferable in the second display device that the shield electrode is connected to ground.

According to the second display device of the present invention, examples of preferable embodiments of the common electrode include: an embodiment in which the common electrode has a comb-tooth shape. The following embodiments are mentioned as a preferable embodiment of the slit which is provided for the common electrode. Embodiments in which: the slit of the common electrode is entirely surrounded by the common electrode; the slit of the common electrode has a rectangular shape; the slit of the common electrode has a rectangular shape having at least one bent part; the slit of the common electrode has a zig-zag shape; the slit of the common electrode has a circular arc shape; and the slit of the common electrode has a meandering shape. As mentioned above, the preferable embodiments of the second display device of the present invention are mentioned. These embodiments are not mentioned in more detail because, in these embodiments, the pixel electrode in the preferable embodiments of the first display device of the present invention is just replaced with the common electrode.

As another preferable embodiment of the above-mentioned common electrode, an embodiment in which the common electrode is formed in a layer different from the pixel electrode, and the shield electrode and an insulating film are between the pixel electrode and the common electrode is mentioned. Similarly in the first display device of the present invention, if the pixel electrode and the common electrode cannot be formed in the same layer, the liquid crystal display device in accordance with such an embodiment exhibits the effects of the present invention.

As another preferable embodiment of the above-mentioned slit provided for the common electrode, an embodiment in which a width of the slit of the common electrode in the reflective region is larger than a width of the slit of the common electrode in the transmissive region is mentioned. Similarly in the first display device of the present invention, the intensity of the electric field generated between the pixel electrode and the common electrode can be effectively decreased, and the shield electrode can be easily arranged between the pixel electrode and the common electrode.

Effect of the Invention

The display device of the present invention can provide bright display by both of the reflective display and the transmissive display without having a multi-gap structure. In addition, because of the absence of the multi-gap structure, the difference in response time of the liquid crystal molecule between the reflective region and the transmissive region can be decreased.

BEST MODES FOR CARRYING OUT THE INVENTION

The present invention is mentioned in more detail below with reference to the following Embodiments, but the present invention is not limited to only these Embodiments.

Embodiment 1

Figure 1:
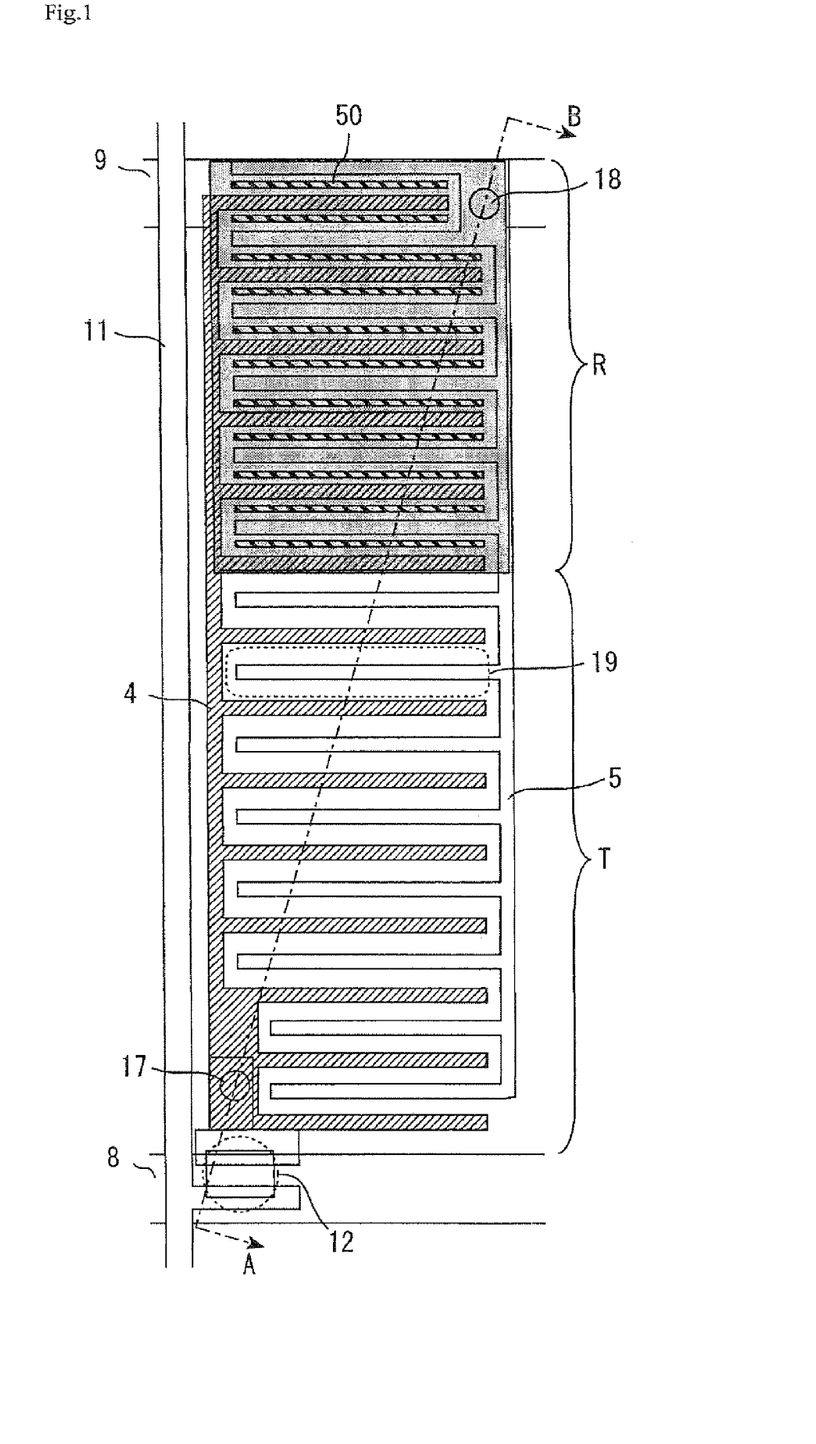
FIG. 1 is a planar view schematically showing one pixel constituting the liquid crystal display device in accordance with Embodiment 1.
Figure 2:
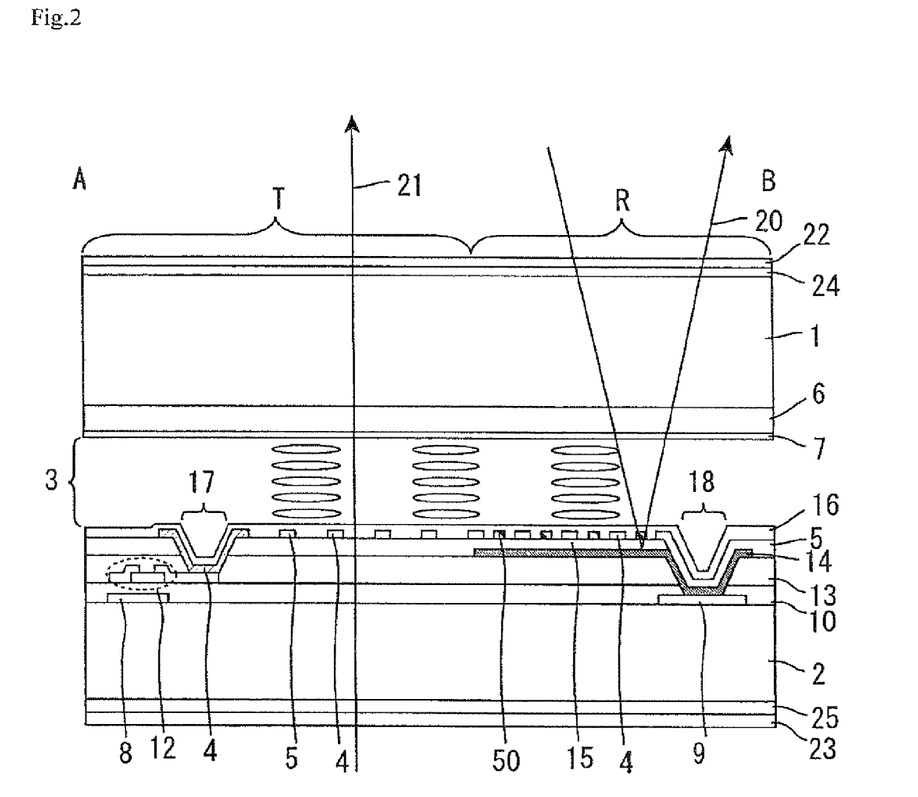
FIG. 2 is a schematic view showing a cross section taken along dashed line A-B shown in FIG. 1.

Embodiment 1 shows a liquid crystal display device in accordance with one embodiment of the display device of the present invention. FIG. 1 is a planar view schematically showing one pixel constituting the liquid crystal display device in Embodiment 1. FIG. 2 is a schematic view showing a cross section taken along dashed line A-B in FIG. 1. The liquid crystal display device in accordance with Embodiment 1 includes the first substrate 1, the second substrate 2, and a liquid crystal layer 3 interposed between these substrates, as shown in FIG. 2. The second substrate 2 includes a pixel electrode 4, a common electrode 5, and a shield electrode 50, and a voltage is applied to the liquid crystal layer 3 through the pixel electrode 4 and the common electrode 5. The shield electrode 50 has a function of adjusting an electric field intensity.

The first substrate 1 includes a color filter layer 6 and the first alignment film 7 on the liquid crystal layer 3 side in this order. A glass substrate can be used as the first substrate 1, for example. The color filter layer 6 includes red, green, and blue regions which are arranged in a repeating pattern. The color filter layer 6 may be composed of regions of four or more colors. Irregularities attributed to the color filter layer 6 may be flattened by a resin layer for flattening, and the like. The first alignment film 7 determines an alignment direction of the liquid crystal layer 3 near the first alignment film 7.

The second substrate 2 includes a scanning wiring 8, a common wiring 9, the first insulating layer 10, a signal wiring 11, a thin film transistor 12, the second insulating layer 13, a reflector 14, and the third insulating layer 15 on the liquid crystal layer 3 side, and further includes the pixel electrode 4, the common electrode 5, and the shield electrode 50, and the second alignment film 16 on the liquid crystal layer 3 side. A glass substrate can be used as the second substrate 2, similarly to the first substrate 1. The scanning wiring 8 and the signal wiring 11 are formed in different layers with the first insulating layer 10 therebetween. Further, the scanning wiring 8 and the signal wiring 11 are perpendicular to each other. The thin film transistor 12 is positioned near the intersection of the scanning wiring 8 with the signal wiring 11. The thin film transistor 12 has an inverted staggered structure. A gate electrode is connected to the scanning wiring 8; a source electrode is connected to the signal wiring 11; and a drain electrode is connected to the pixel electrode 4 through the first contact hole 17. A channel part of the thin film transistor 12 is formed of an amorphous silicon layer. The common wiring 9 is parallel to the scanning wiring 8 and it is connected to the common electrode 5 through the second contact hole 18.

Each of the pixel electrode 4 and the common electrode 5 has a comb-tooth shape, and the comb tooth (projection part) is linearly formed. Each of the pixel electrode 4 and the common electrode 5 has a rectangular slit 19 parallel to the scanning wiring 8. The shield electrode 50 has a rectangular shape, and it is formed between the comb tooth of the pixel electrode 4 and the comb tooth of the common electrode 5 to be parallel to the comb teeth. The shield electrode 50 may be connected to ground through a wiring. The pixel electrode 4, the common electrode 5, and the shield electrode 50 are transparent electrodes made of ITO (Indium Tin Oxide) and these electrodes are formed in the same layer. Accordingly, production steps can be simplified in comparison to the case that these electrodes are formed in different layers. Further, the common electrode 5 has a slit having substantially the same shape as that of the pixel electrode 4. According to such a liquid crystal display device in Embodiment 1, a voltage is applied to the pixel electrode 4 and the common electrode 5, and thereby a horizontal electric field is generated in the liquid crystal layer 3, which brings a change in alignment of the liquid crystal. Thus, light which passes through the liquid crystal layer 3 is controlled.

In FIGS. 1 and 2, a region which overlaps with the reflector 14 is a reflective region R, and a black part in FIG. 1 is a reflective region R. In this reflective region R, the shield electrode 50 is arranged. As shown in FIG. 2, reflective light 20 passes through the reflective region R. Transmissive light 21 from a backlight passes through a transmissive region T. According to Embodiment 1, as shown in FIG. 1, the transmissive region T and the reflective region R are arranged in such a way that a boundary between the transmissive region T and the reflective region R is parallel to the short side of the pixel in order to shorten the boundary. Aluminum or a silver alloy and the like, having a high reflectance, is preferable as the material for the reflector 14. The common wiring 9 is formed of aluminum with a high reflectivity to have a large width, thereby covering the reflective region. As a result, the common wiring can be used also as a reflector and the production steps can be simplified.

According to Embodiment 1, the pixel electrode 4, the common electrode 5, and the shield electrode 50 are formed of the same material between the transmissive region T and the reflective region R. In the reflective region R, however, the shield electrode 50 is arranged between the pixel electrode 4 and the common electrode 5. Therefore, a voltage which is applied to the liquid crystal layer 3 is different in intensity between the transmissive region T and the reflective region R. Accordingly, both of the reflective display and the transmissive display can be performed without providing the liquid crystal layer 3 with a multi-gap structure by additionally forming a step-forming layer in the reflective region R. The second alignment film 16 is further provided on the liquid crystal layer 3 side of the pixel electrode 4. The second alignment film 16 determines the alignment direction of the liquid crystal layer 3 near the second alignment film 16.

Figure 3:
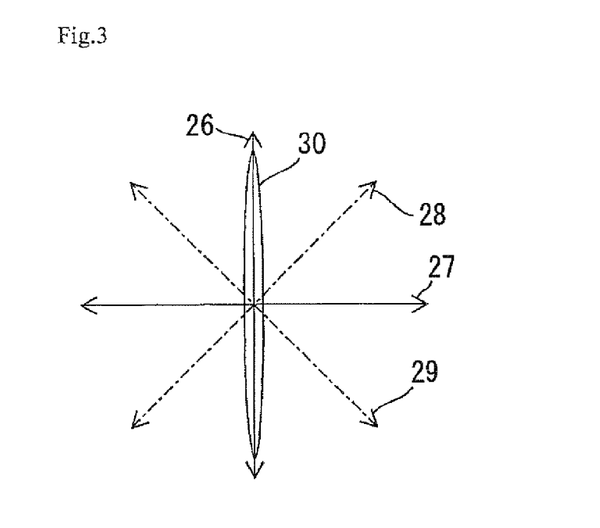
FIG. 3 is a schematic view showing arrangement relationship among the polarizer, the retarder, and the liquid crystal molecule during no voltage application in accordance with Embodiments 1 to 3.
Figure 4:
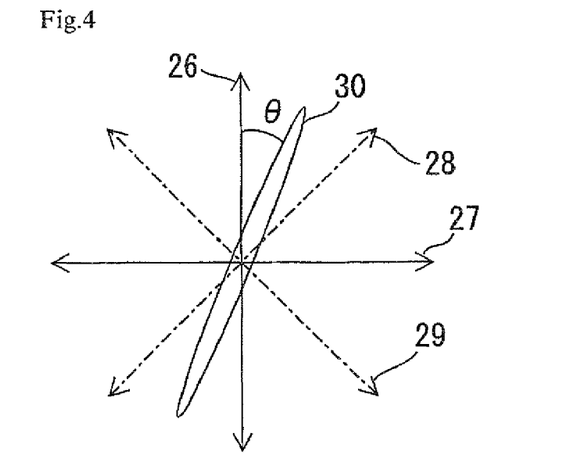
FIG. 4 is a schematic view showing arrangement relationship among the polarizer, the retarder, and the liquid crystal molecule in the reflective region during voltage application in accordance with Embodiments 1 to 3.
Figure 5:
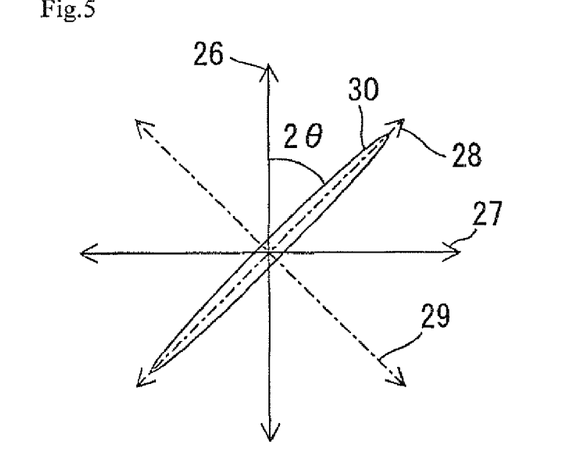
FIG. 5 is a schematic view showing arrangement relationship among the polarizer, the retarder, and the liquid crystal molecule in the transmissive region during voltage application in accordance with Embodiments 1 to 3.

FIGS. 3, 4, and 5 each show an arrangement relationship among the polarizer, the retarder, and the liquid crystal molecule. FIG. 3 shows an arrangement relationship among the polarizer, the retarder, and the liquid crystal molecule under no voltage application. FIG. 4 shows an arrangement relationship among the polarizer, the retarder, and the liquid crystal molecule in the reflective region under voltage application. FIG. 5 shows an arrangement relationship among the polarizer, the retarder, and the liquid crystal molecule in the transmissive region under voltage application.

According to Embodiment 1, as shown in FIG. 2, the first polarizer 22 is arranged on the side opposite to the liquid crystal layer 3 of the first substrate 1, and the second polarizer 23 is arranged on the side opposite to the liquid crystal layer 3 of the second substrate 2. The first and second polarizers 22 and 23 are arranged in such a way that a transmission axis 26 of the first polarizer 22 is perpendicular to a transmission axis 27 of the second polarizer 23. The first retarder 24 is arranged between the first substrate 1 and the first polarizer 22. The second retarder 25 is arranged between the second substrate 2 and the second polarizer 23.

As shown in FIG. 3, the first retarder 24 has a retardation of ¼ wavelength, and the phase delay axis 28 is set to make an angle of 45° with the alignment direction of the liquid crystal molecule 30 in the clockwise direction. The transmission axis 26 of the first polarizer 22 is set to be parallel to the alignment direction of the liquid crystal molecule 30. The second retarder 25 has a retardation of ¼ wavelength. The second retarder 25 is arranged in such a way that the phase delay axis 29 is perpendicular to the phase delay axis 28 of the first retarder 24.

In the reflective region R, if a voltage of less than a threshold is applied to the pixel electrode 4 and the common electrode 5, a stacked body composed of the liquid crystal layer 3, the first polarizer 22 and the first retarder 24 functions as a circular polarizer. A linear polarized light which has passed through the first polarizer 22 is converted into a circularly-polarized light after passing through the first retarder 24. Then, the circularly-polarized light is reflected by the reflector 14 and converted into a counter-rotating circularly-polarized light. When entering the first polarizer 22 again, the light is converted into a linear polarized light whose oscillation direction is vertical to the transmission axis 26 of the first polarizer 22. Therefore, the linear polarized light is absorbed by the first polarizer 22 and dark display is obtained. If a voltage more than a threshold is applied to the pixel electrode 4 and the common electrode 5, as shown in FIG. 4, the alignment of the liquid crystal molecule 30 is changed by a specific angle θ in the clockwise direction. As a result, incident light is reflected by the reflector 14, and then when entering the first polarizer 22 again, the light is converted into linear polarized light whose oscillation direction is parallel to the transmission axis of the first polarizer 22. Therefore, the light is not absorbed by the first polarizer 22 and bright display is obtained.

In the transmissive region T, the first retarder 24 is perpendicular to the second retarder 25. Therefore, a retardation in the normal direction of the first substrate 1 is zero, and the display in this direction is not influenced. If a voltage of less than a threshold is applied to the pixel electrode 4 and the common electrode 5, the long axis of the liquid crystal molecule 30 is perpendicular to the transmission axis 27 of the second polarizer 23. Therefore, the linear polarized light which has passed through the second polarizer 23 is a linear polarized light vertical to the transmission axis 26 of the first polarizer 22. Therefore, the light is absorbed by the first polarizer 22, and dark display is obtained. If a voltage of more than a threshold is applied to the pixel electrode 4 and the common electrode 5, as shown in FIG. 5, the alignment of the liquid crystal molecule 30 is changed by a specific angle 2θ in the clockwise direction. When entering the first polarizer 22, the light is converted into a linear polarized light whose oscillation direction is parallel to the transmission axis 26 of the first polarizer 22. Therefore, the light is not absorbed by the first polarizer 22, and bright display is obtained.

The first and second retarders 24 and 25 are made of a material which hardly shows wavelength dispersion of refractive index, for example, a norbornene material (product of JSR Corp., trade name: ARTON). In such a case, darker display which is less colored can be obtained.

Thus-prepared transflective liquid crystal display panel is connected to a driving device, and a backlight is arranged on the back face of the panel, for example. Thus, a transflective liquid crystal display device is completed.

A modified embodiment of Embodiment 1 is mentioned below.

Figure 6:
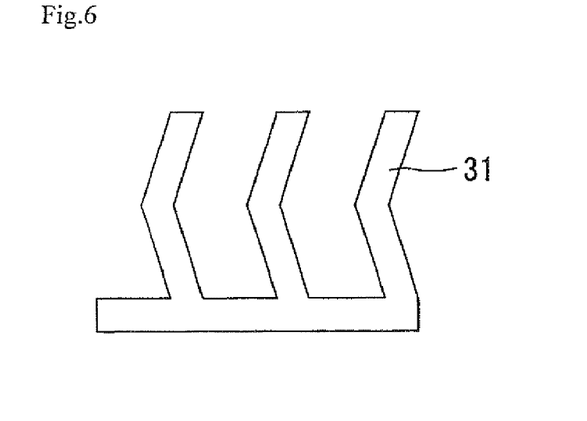
FIG. 6 is a planar view schematically showing an electrode (either or both of the pixel electrode and the common electrode) in accordance with a modified embodiment (the rectangular slit has one bent part) of Embodiment 1.
Figure 7:
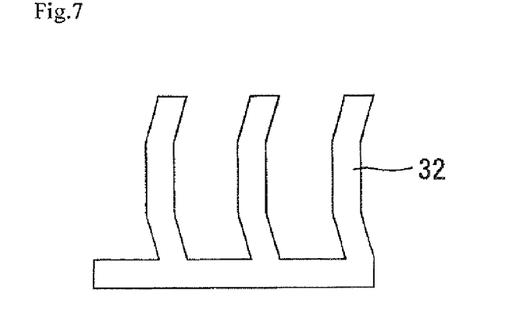
FIG. 7 is a planar view schematically showing an electrode (either or both of the pixel electrode and the common electrode) in accordance with a modified embodiment (the rectangular slit has two bent parts) of Embodiment 1.
Figure 8:
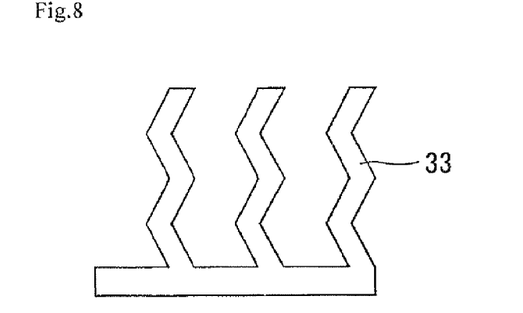
FIG. 8 is a planar view schematically showing an electrode (either or both of the pixel electrode and the common electrode) in accordance with a modified embodiment (the rectangular slit has three bent parts) of Embodiment 1.
Figure 9:
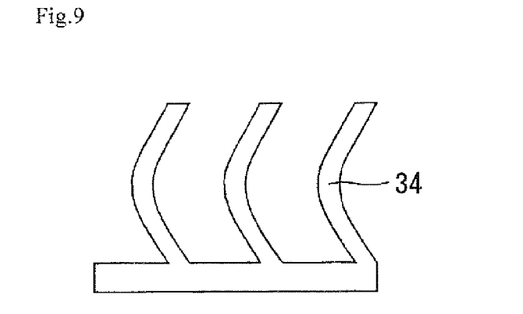
FIG. 9 is a planar view schematically showing an electrode (either or both of the pixel electrode and the common electrode) in accordance with a modified embodiment (the slit has a circular arc shape) of Embodiment 1.
Figure 10:
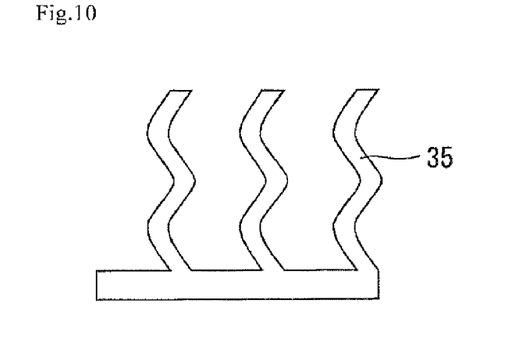
FIG. 10 is a planar view schematically showing an electrode (either or both of the pixel electrode and the common electrode) in accordance with a modified embodiment (the slit has a meandering shape) of Embodiment 1.

According to the present embodiment, the comb tooth (projection part) of the pixel electrode 4 and the common electrode 5 each having a comb-tooth shape may not have a linear shape shown in FIG. 1. For example, it may have a shape shown in FIGS. 6 to 10. According to the comb-tooth-shaped electrode 31 (either or both of the pixel electrode 4 and the common electrode 5) shown in FIG. 6, the comb tooth has a V shape which has one bent part at the middle of the comb tooth, like a broken line. The slit of the comb-tooth-shaped electrode 31 has a rectangular shape having one bent part. The comb tooth of the comb-tooth-shaped electrode 32 shown in FIG. 7 has two bent parts, like a broken line. The entire of the comb tooth has a substantially V shape. The slit of the comb-tooth-shaped electrode 32 has a rectangular shape having two bent parts. With regard to the comb-tooth-shaped electrode 33 shown in FIG. 8, the comb tooth has three bent parts, like a broken line. The entire of the comb tooth has a shape composed of two substantially V shapes. The slit of the comb-tooth-shaped electrode 33 has a rectangular shape having three bent parts, that is, a zig-zag shape. With regard to the comb-tooth-shaped electrode 34 shown in FIG. 9, the comb tooth has a circular arc shape which has a curved part at the middle of the comb tooth. The slit of the comb-tooth-shaped electrode 34 also has a circular arc shape. With regard to the comb-tooth-shaped electrode 35 shown in FIG. 10, the comb tooth has a circular arc shape which has three curved parts. The entire of the comb tooth has a shape composed of two substantially V shapes. The slit of the comb-tooth-shaped electrode 35 has a meandering shape.

Figure 11:
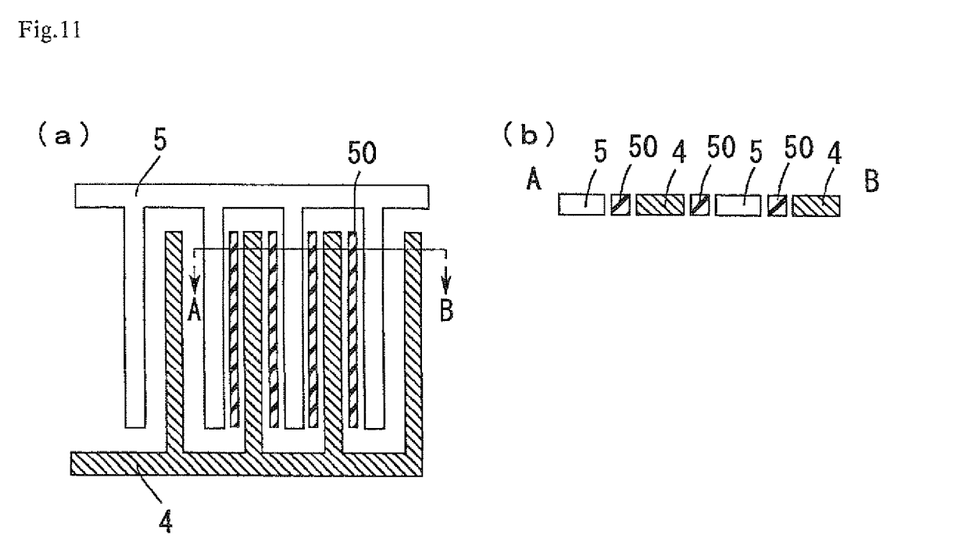
FIG. 11 is a schematic view showing the pixel electrode and the common electrode (the slit has a rectangular shape) in accordance with Embodiment 1.

FIG. 11 is a schematic view showing the pixel electrode 4 and the common electrode 5 in Embodiment 1. FIG. 11(a) is a planar view schematically showing the pixel electrode 4 and the common electrode 5. FIG. 11(b) is a schematic view showing a cross section taken along dashed line A-B in FIG. 11(a). As shown in FIG. 11(b), the pixel electrode 4, the common electrode 5, and the shield electrode 50 are formed in the same layer.

Embodiment 2

Figure 12:
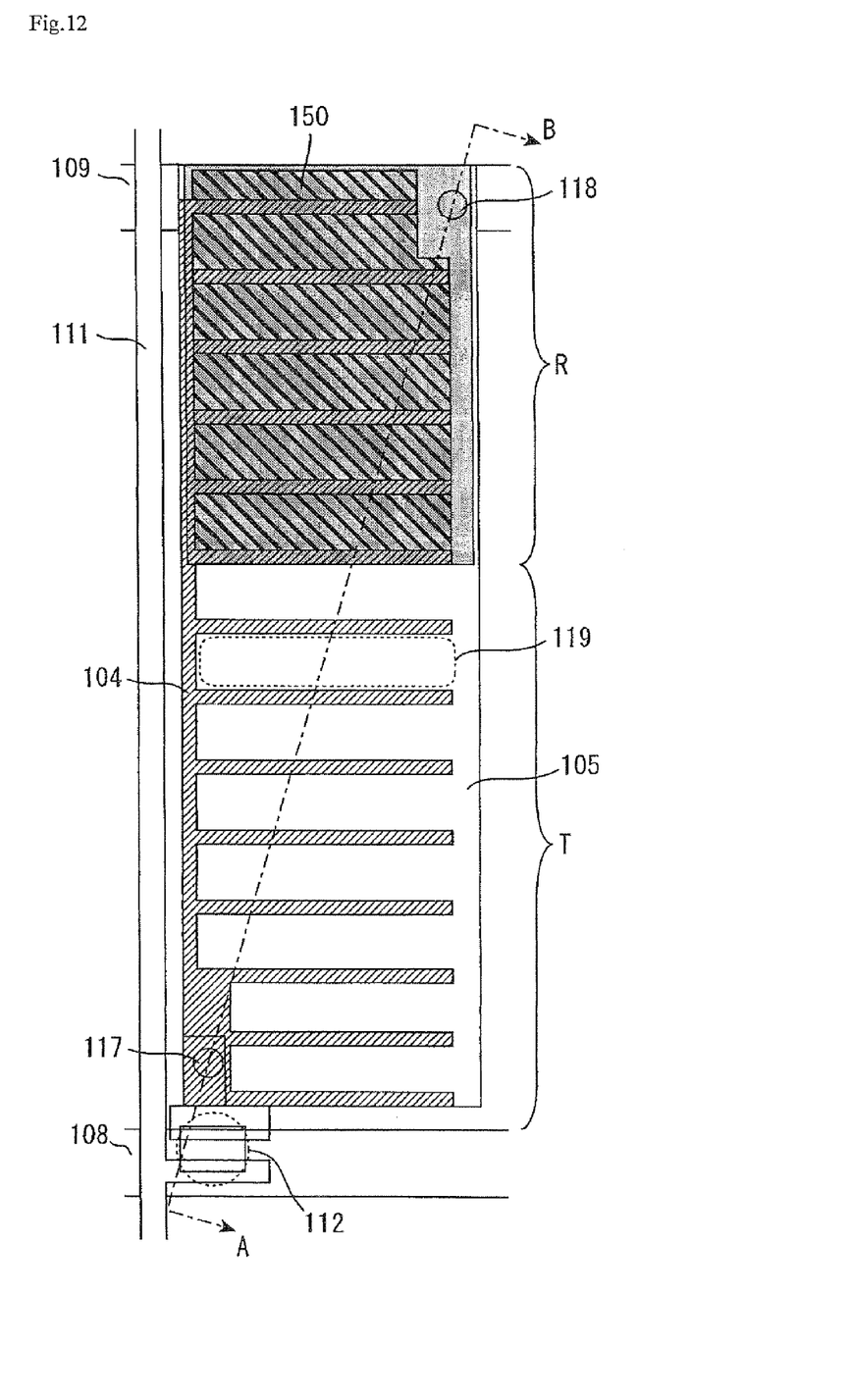
FIG. 12 is a planar view schematically showing one pixel constituting the liquid crystal display device in Embodiment 2.
Figure 13:
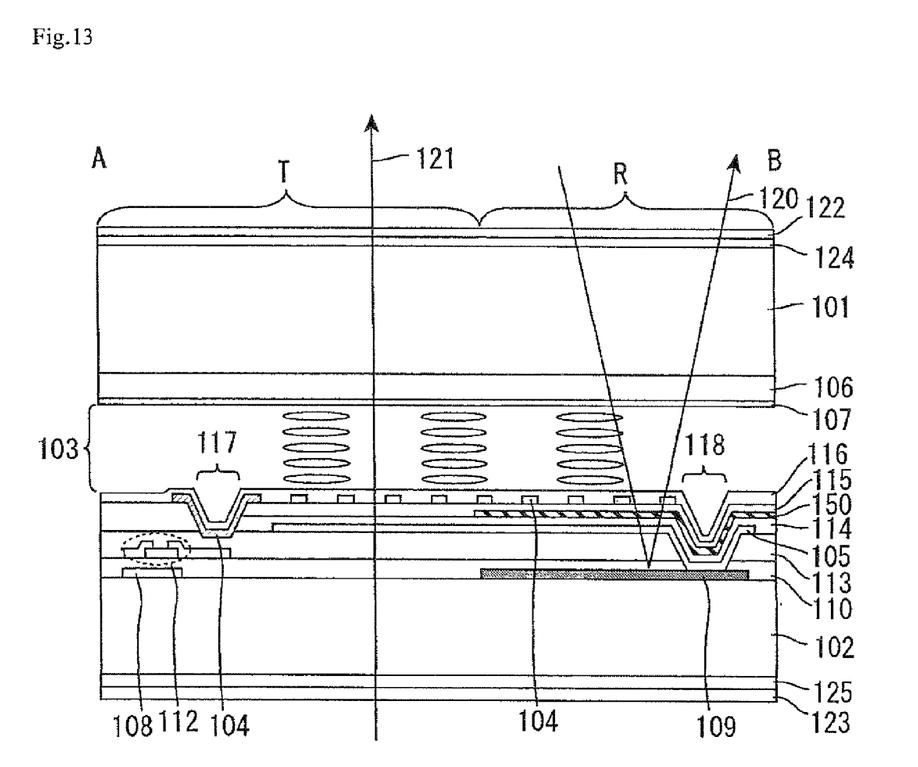
FIG. 13 is a schematic view showing a cross section taken along dashed line A-B in FIG. 13.

Embodiment 2 shows a liquid crystal display device in accordance with one embodiment of the display device of the present invention. FIG. 12 is a planar view schematically showing one pixel constituting a liquid crystal display device in accordance with Embodiment 2. FIG. 13 is a schematic view showing a cross section taken along dashed line A-B in FIG. 12. The liquid crystal display device in accordance with Embodiment 2 includes the first substrate 101, the second substrate 102, and a liquid crystal layer 103 interposed between these substrates, as shown in FIG. 13. The second substrate 102 includes a pixel electrode 104, a common electrode 105, and a shield electrode 150. A voltage is applied to the liquid crystal layer 103 through the pixel electrode 104 and the common electrode 105. The shield electrode 150 has a function of adjusting an electric field intensity.

The first substrate 101 includes a color filter layer 106 and the first alignment film 107 on the liquid crystal layer 103 side in this order. A glass substrate may be used as the first substrate 101, for example. The color filter layer 106 includes red, green, and blue regions which are arranged in a repeating pattern. The color filter layer 106 may be composed of regions of four or more colors. Irregularities attributed to the color filter layer 106 may be flattened by a resin layer for flattening, and the like. The first alignment film 107 determines an alignment direction of the liquid crystal layer 103 near the first alignment film 107. The first alignment film 107 determines an alignment direction of the liquid crystal layer 103 near the first alignment film 107.

The second substrate 102 includes a scanning wiring 108, a common wiring (reflector) 109, the first insulating layer 110, a signal wiring 111, a thin film transistor 112, the second insulating layer 113, a common electrode 105, the third insulating layer 114, the shield electrode 150, and the fourth insulating layer 115 on the liquid crystal layer 103 side. Further, the second substrate 102 includes a pixel electrode 104 and the second alignment film 116 on the liquid crystal layer 103 side. A glass substrate can be used as the second substrate 102, similarly to the first substrate 101, for example. The scanning wiring 108 and the signal wiring 111 are formed in different layers with the first insulating layer 110 therebetween. The thin film transistor 112 is positioned near the intersection of the scanning wiring 108 with the signal wiring 111. The thin film transistor 102 has an inverted staggered structure. The gate electrode is connected to the scanning wiring 108 and the source electrode is connected to the signal wiring 111. The drain electrode is connected to the pixel electrode 104 through the first contact hole 117. The channel part of the thin film transistor 112 is formed of an amorphous silicon layer. The common wiring 109 is parallel to the scanning wiring 108 and it is connected to the common electrode 105 through the second contact hole 118.

The pixel electrode 104 has a comb-tooth shape, and the comb tooth (projection part) is linearly formed. The pixel electrode 4 has a rectangular slit 119 parallel to the scanning wiring 108. The common electrode 105 is formed over the entire pixel and it is positioned in a layer lower than the pixel electrode 104. The shield electrode 150 is arranged in the reflective region R. Further, the shield electrode 150 is positioned between the pixel electrode 104 and the common electrode 105. The third insulating layer 114 is positioned between the shield electrode 150 and the common electrode 105. The fourth insulating layer 115 is positioned between the shield electrode 150 and the pixel electrode 104. In this case, the shield electrode 150 may be connected to ground through a wiring. The shield electrode 150 is a transparent electrode made of indium tin oxide (ITO). According to such a liquid crystal display device in Embodiment 2, a voltage is applied to the liquid crystal layer 103 through the pixel electrode 104 and the common electrode 105, thereby generating an electric field in the liquid crystal layer 103. As a result, a change in alignment is generated in the liquid crystal layer 103. As a result, light which passes through the liquid crystal layer 103 is controlled.

The common wiring 109 protrude to the display region side and reflects reflective light 120, as shown in FIG. 13. In FIGS. 12 and 13, the region overlapping with the common wiring 109 is a reflective region R. As shown in FIG. 13, transmissive light 121 from a backlight passes through the transmissive region T. According to Embodiment 2, the wirings such as the common wiring 109 are used as a reflector, which provides an effect of decreasing production steps. The common wiring 109 is formed of aluminum with a high reflectance, and thereby brighter reflective display is obtained. Instead of the common wiring 109, a reflector made of aluminum or a silver alloy, and the like, may be additionally formed as in Embodiment 1. In Embodiment 2, as shown in FIG. 13, the transmissive region T and the reflective region R are arranged in such a way that a boundary between the transmissive region T and the reflective region R is parallel to the short side of the pixel in order to shorten the boundary.

According to Embodiment 2, the pixel electrode 104, the common electrode 105, and the shield electrode 150 are formed of the same material between the transmissive region T and the reflective region R. In the reflective region R, however, the shield electrode 150 is arranged between the pixel electrode 104 and the common electrode 105. Therefore, a voltage which is applied to the liquid crystal layer 103 is different in intensity between the transmissive region T and the reflective region R. Accordingly, both of the reflective display and the transmissive display can be performed without providing the liquid crystal layer 103 with a multi-gap structure by additionally forming a step-forming layer in the reflective region R. The second alignment film 116 is further provided on the liquid crystal layer 103 side of the pixel electrode 104. The second alignment film 116 determines the alignment direction of the liquid crystal layer 103 near the second alignment film 116.

The arrangement relationship among the polarizer, the retarder, and the liquid crystal molecule in Embodiment 2 is the same as in Embodiment 1. The first polarizer 122 is arranged on the side opposite to the liquid crystal layer of the first substrate 101. The second polarizer 123 is arranged on the side opposite to the liquid crystal layer of the second substrate 102. The first and second polarizers 122 and 123 are arranged in such a way that a transmission axis of the first polarizer 122 is perpendicular to a transmission axis of the second polarizer 123. Between the first substrate 101 and the first polarizer 122, the first retarder 124 is arranged. Between the second substrate 102 and the second polarizer 123, the second retarder 125 is arranged. The first retarder 124 has a retardation of ¼ wavelength and the phase delay axis is set to make an angle of 45° with the alignment direction of the liquid crystal molecule in the clockwise direction. The first polarizer 122 has a transmission axis parallel to the alignment direction of the liquid crystal molecule. The second retarder 125 has a retardation of ¼ wavelength, and the phase delay axis of the second retarder 125 is perpendicular to the phase delay axis of the first retarder 124.

The first and second retarders 124 and 125 are made of a material which hardly shows wavelength dispersion of refractive index, for example, a norbornene material (product of JSR Corp., trade name: ARTON). In such a case, darker display which is less colored can be obtained.

Thus-prepared transflective liquid crystal display panel is connected to a driving device, and a backlight is arranged on the back face of the panel, for example. Thus, a transflective liquid crystal display device is completed.

Figure 14:
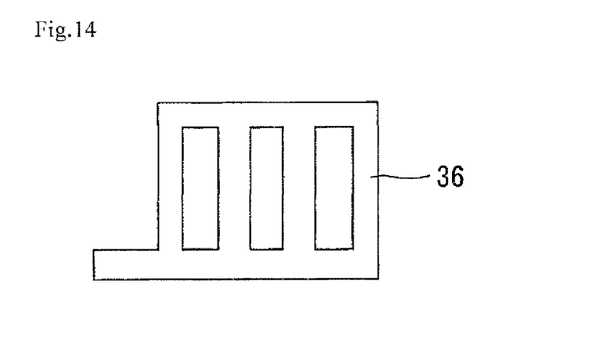
FIG. 14 is a planar view schematically showing an electrode (either the pixel electrode or the common electrode) in accordance with a modified embodiment (the slit is entirely surrounded by the electrode) of Embodiment 2.

A modified embodiment of Embodiment 2 is mentioned. According to Embodiment 2, the comb tooth (projection part) of the pixel electrode 104 having a comb-tooth shape may not have a linear shape shown in FIG. 12. For example, it may have a shape shown in FIGS. 6 to 10. In Embodiment 2, the pixel electrode 104 may not have a comb-tooth shape, and it may be an electrode 36 which has a rectangular slit entirely surrounded by the pixel electrode, as shown in FIG. 14.

Figure 15:
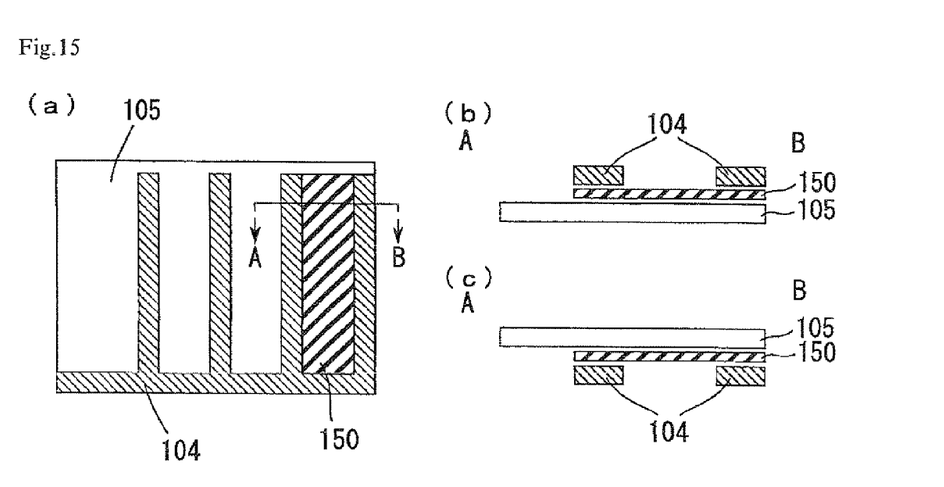
FIG. 15 is a schematic view showing the pixel electrode and the common electrode (the slit has a rectangular shape) in accordance with Embodiment 2.

FIG. 15 is a planar view schematically showing the pixel electrode 104, the common electrode 105, and the shield electrode 150 in accordance with Embodiment 2. FIG. 15(*a*) is a planar view schematically showing the pixel electrode 104 and the common electrode 105. FIGS. 15(*b*) and 15(*c*) are schematic views of the cross-section taken along dashed line A-B in FIG. 15(*a*). The arrangement relationship between the pixel electrode 104 and the common electrode 105 is not limited to the embodiment shown in FIG. 15(*b*), in which the pixel electrode 104 is formed closer to the liquid crystal layer 103 than the common electrode 105. As shown in FIG. 15(*c*), the common electrode 105 may be arranged closer to the liquid crystal layer 103 than the pixel electrode 104.

According to the present Embodiment, the width of the slit of the pixel electrode and/or the common electrode in the reflective region may be larger than that in the transmissive region. In such an embodiment, the shield electrode can be easily arranged between the pixel electrode and the common electrode in the reflective region. Further, if a distance between the pixel electrode and the common electrode in the reflective region is larger than that in the transmissive region, the intensity of the electric field generated between the pixel electrode and the common electrode in the reflective region can be made smaller than that in the transmissive region. Therefore, if the shield electrode is formed and further this embodiment is adopted, the intensity of the electric field generated between the pixel electrode and the common electrode can be more effectively decreased.

The present application claims priority under the Paris Convention and the domestic law in the country to be entered into national phase on Patent Application No. 2006-188068 filed in Japan on Jul. 7, 2006, the entire contents of which are hereby incorporated by reference.

The term "or more" in the present description means that the value described (boundary value) is included.

BRIEF DESCRIPTION OF DRAWINGS

FIG. 11(a) shows a schematic planar view. FIG. 11(b) is a schematic view showing a cross section taken along dashed line A-B in FIG. 11(a).

FIG. 15(a) is a schematic planar view. FIGS. 15(b) and 15(c) are schematic views each showing a cross section taken along dashed line A-B in FIG. 15(a).

EXPLANATION OF NUMERALS AND SYMBOLS 1, 101: The first substrate
2, 102: The second substrate
3, 103: Liquid crystal layer
4, 104: Pixel electrode
5, 105: Common electrode
6, 106: Color filter layer
7, 107: The first alignment film
8, 108: Scanning wiring
9, 109: Common wiring
10, 110: The first insulating layer
11, 111: Signal wiring
12, 112: Thin film transistor
13, 113: The second insulating layer
14: Reflector
15, 115: The third insulating layer
16, 116: The second alignment film
17, 117: The first contact hole
18, 118: The second contact hole
19, 119: Slit
20, 120: Reflective light
21, 121: Transmissive light
22, 122: The first polarizer
23, 123: The second polarizer
24, 124: The first retarder
25, 125: The second retarder
26: Transmission axis of the first polarizer
27: Transmission axis of the second polarizer
28: Phase delay axis of the first retarder
29: Phase delay axis of the second retarder
30: Liquid crystal molecule
31: Comb-tooth-shaped electrode (the rectangular slit has one bent part)
32: Comb-tooth-shaped electrode (the rectangular slit has two bent parts)
33: Comb-tooth-shaped electrode (the rectangular slit has three bent parts)
34: Comb-tooth-shaped electrode (the slit has a circular arc shape)
35: Comb-tooth-shaped electrode (the slit has a meandering shape)
36: Electrode (the slit is entirely surrounded by the electrode)
50, 150: Shield electrode
114: The fourth insulating layer
T: Transmissive region
R: Reflective region

The invention claimed is:

1. A display device comprising:
a pair of substrates; a display medium interposed between the pair of substrates; and a pixel having a reflective region for performing reflective display and a transmissive region for performing transmissive display,
wherein the display device includes a pixel electrode and a common electrode on one of the pair of substrates,
a voltage is applied to the display medium through the pixel electrode and the common electrode,
the pixel electrode is provided with a slit, and
shield electrodes are arranged between the pixel electrode and the common electrode in the reflective region so that shield electrodes are present in the reflective region but not in the transmissive region of a given pixel.

2. The display device according to claim 1, wherein the shield electrode is connected to ground.

3. The display device according to claim 1, wherein the pixel electrode has a comb-tooth shape.

4. The display device according to claim 1, wherein the slit of the pixel electrode is entirely surrounded by the pixel electrode.

5. The display device according to claim 1, wherein the slit of the pixel electrode has a rectangular shape.

6. The display device according to claim 1, wherein the slit of the pixel electrode has a rectangular shape having at least one bent part.

7. The display device according to claim 1, wherein the slit of the pixel electrode has a zig-zag shape.

8. The display device according to claim 1, wherein the slit of the pixel electrode has a circular arc shape.

9. The display device according to claim 1, wherein the slit of the pixel electrode has a meandering shape.

10. The display device according to claim 1, wherein the common electrode is formed in a layer different from the pixel electrode, and the shield electrode and an insulating film are between the pixel electrode and the common electrode.

11. The display device according to claim 1, wherein the common electrode is provided with a slit.

12. The display device according to claim 11, wherein the pixel electrode and the common electrode are arranged in a layer where the shield electrode is formed.

13. The display device according to claim 11, wherein the slit of the common electrode has substantially the same shape as a shape of the slit of the pixel electrode.

14. The display device according to claim 1, wherein a width of the slit of the pixel electrode in the reflective region is larger than a width of the slit of the pixel electrode in the transmissive region.

15. A display device comprising:
a pair of substrates; a display medium interposed between the pair of substrates; and a pixel having a reflective region for performing reflective display and a transmissive region for performing transmissive display, wherein the display device includes a pixel electrode and a common electrode on one of the pair of substrates, a voltage is applied to the display medium through the pixel electrode and the common electrode, the common electrode is provided with a slit, and shield electrodes are arranged between the pixel electrode and the common electrode in the reflective region so that shield electrodes are present in the reflective region but not in the transmissive region of the pixel.

16. The display device according to claim 15, wherein the shield electrode is connected to ground.

17. The display device according to claim 15, wherein the common electrode has a comb-tooth shape.

18. The display device according to claim 15, wherein the slit of the common electrode is entirely surrounded by the common electrode.

19. The display device according to claim 15, wherein the slit of the common electrode has a rectangular shape.

20. The display device according to claim 15, wherein the slit of the common electrode has a rectangular shape having at least one bent part.

21. The display device according to claim 15, wherein the slit of the common electrode has a zig-zag shape.

22. The display device according to claim 15, wherein the slit of the common electrode has a circular arc shape.

23. The display device according to claim 15, wherein the slit of the common electrode has a meandering shape.

24. The display device according to claim 15, wherein the common electrode is formed in a layer different from the pixel electrode, and the shield electrode and an insulating film are between the pixel electrode and the common electrode.

25. The display device according to claim 15, wherein a width of the slit of the common electrode in the reflective region is larger than a width of the slit of the common electrode in the transmissive region.

* * * * *